US007950311B2

(12) United States Patent
Chen

(10) Patent No.: US 7,950,311 B2

(45) Date of Patent: May 31, 2011

(54) SCREWDRIVER KIT

(75) Inventor: Tsai-Ching Chen, Chang Hua Hsien (TW)

(73) Assignee: Hi Fanny, Yilan County (TW)

( * ) Notice: Subject to any disclaimer, the term of this patent is extended or adjusted under 35 U.S.C. 154(b) by 320 days.

(21) Appl. No.: 12/261,111

(22) Filed: Oct. 30, 2008

(65) Prior Publication Data

US 2010/0108562 A1 May 6, 2010

(51) Int. Cl.
*B25B 23/16* (2006.01)
*B23B 23/00* (2006.01)

(52) U.S. Cl. ........................................ 81/177.4; 81/439

(58) Field of Classification Search ................. 81/177.4, 81/490, 438, 439; 206/377, 234
See application file for complete search history.

(56) References Cited

U.S. PATENT DOCUMENTS

| | | | | |
|---|---|---|---|---|
| 6,601,483 | B2 * | 8/2003 | Wannop | 81/490 |
| 7,237,458 | B2 * | 7/2007 | Shiao | 81/62 |
| 7,565,852 | B2 * | 7/2009 | Yu | 81/177.4 |

FOREIGN PATENT DOCUMENTS

| | | |
|---|---|---|
| TW | M307492 | 3/2007 |

* cited by examiner

*Primary Examiner* — D. S Meislin

(57) ABSTRACT

A screwdriver kit includes a main body which has a first end adapted for connecting to a tool and a second end. A column projects from the second end and has an opening formed therein longitudinally. A linkage has a first end and a second end, with the second end of the linkage slideably received in the opening. A cap member, which has the second end of the linkage installed therein, is movable between a first position and a second position. The cap member is coupled to the main body when the cap member is in the first position. The cap member is detached from the main body along the linkage when the cap member is moved toward the second position.

17 Claims, 8 Drawing Sheets

SCREWDRIVER KIT

BACKGROUND OF THE INVENTION

1. Field of the Invention

The present invention relates to a screwdriver kit.

2. Description of the Related Art

Referring to Taiwan Patent No. M307492, it discloses a screwdriver with a bit shank and a handle. A plurality of bit storage holes are arranged on sides of the handle for positioning the bits therein. Moreover, at least one of pivotal portions is provided on the extremity of sides of the handle. At least one of cap members is installed to the at least one of pivotal portions respectively for covering the bits.

However, the cited screwdriver is too big to store, and it can not be carried easily.

The present invention will become clearer in light of the following detailed description of illustrative embodiments of this invention described in connection with the drawings.

SUMMARY OF THE INVENTION

Aspects of the present invention address one or more of the issues mentioned above, thereby providing a screwdriver kit. The screwdriver kit includes a main body and a cap member and is adapted for storing bits and a bit shank therein. The cap member is switchable between a first position and a second position. In the first position, the cap member is attached with the main body, and the whole screwdriver kit is in a form of capsule. In the second position, the cap member is detached from the main body for removing the bits and bit shank easily and conveniently.

These and other aspects are addressed in relation to the Figures and related description.

BRIEF DESCRIPTION OF THE DRAWINGS

The present invention will be described via detailed illustration of the preferred embodiments referring to the drawings.

Detailed Description of the Preferred Embodiments

Figure 1:
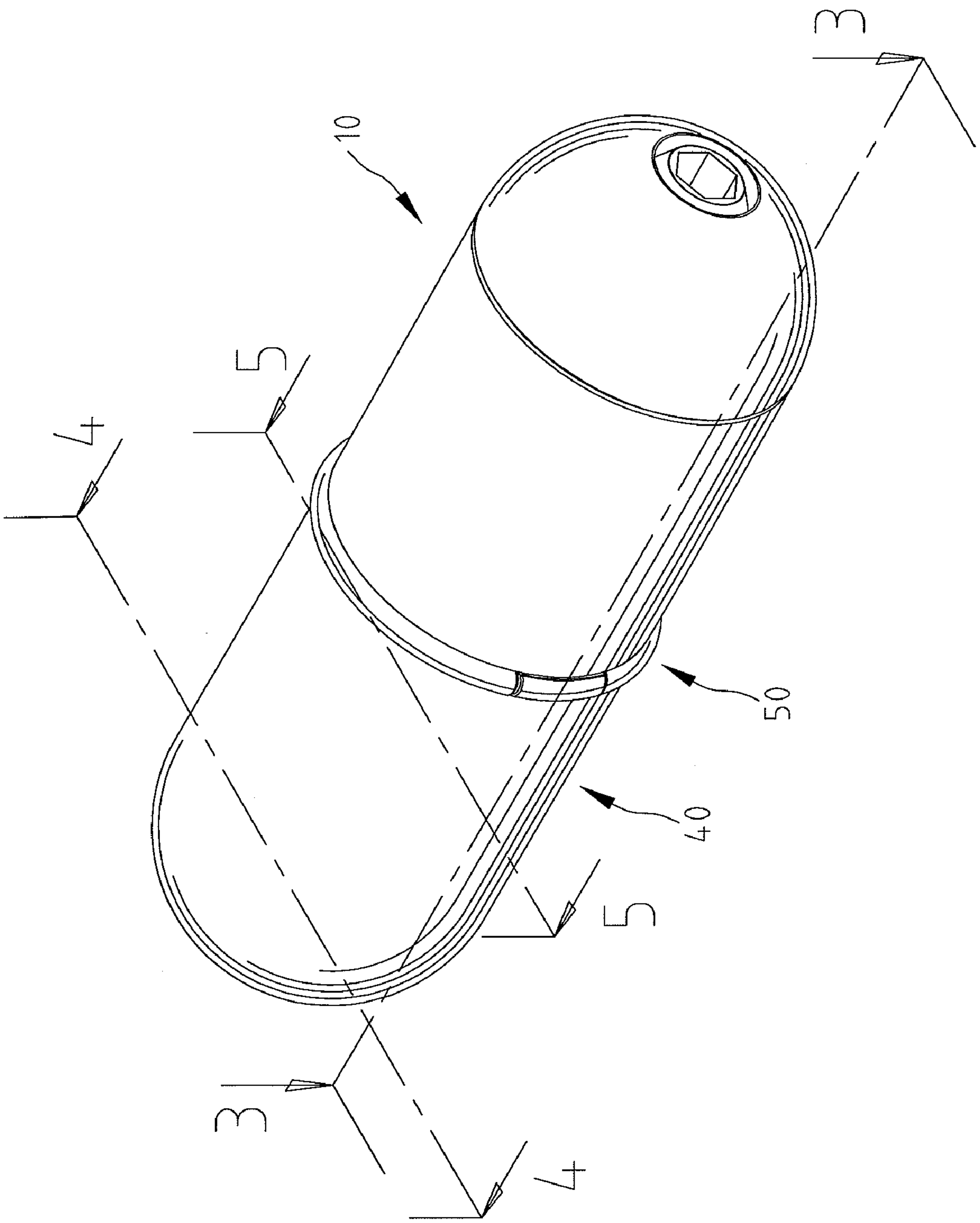
FIG. 1 is a perspective view of a screwdriver kit according to the preferred embodiment of the present invention.

Referring FIGS. 1 through 4, a screwdriver kit in accordance with the preferred embodiment in the present invention includes a main body 10, a linkage 20, a bit storage member 30, a cap member 40, a locking member 50 and a chuck member 60.

The main body 10 includes a first end 11 and a second end 12. The first end 11 is adapted for connecting to a tool such as a chuck or things like that. In this case, the chuck member 60 is detachably installed to the first end 11 and includes a bore 61 formed thereon and a magnetic portion 62 provided in the bore 61. The bore 61 is adapted for receiving a tool such as a screwdriver bit or things like that. The magnetic portion 62 is adapted for attaching with the tool which is received in the bore 61.

A column 13 longitudinally extends from the second end 12 of the main body 10 and includes an opening 131 longitudinally formed therein. The opening 131 communicates with the interior of the main body 10. A transverse cross-section of the column 13 is preferably hexagon, and a transverse cross-section of the opening 131 is preferably hexagon. A slot 132 is formed on the outer periphery of the column 13 and adjacent to the extremity of the column 13 opposite to the second end 12 of the main body 10. The slot 132 is preferably U-shaped and has two legs. The legs of the slot 132 and the opening 131 are in communication with each other. A U-shaped fastener 133 is received in the slot 132 and inserted into the opening 131.

An engaged portion 14 is provided around the column 13 and against the second end 12. A diameter of the engaged portion 14 is smaller than that of the main body 10. A plurality of engaged recesses 141 is longitudinally formed on the outer periphery of the engaged portion 14 and spaced from each other. A slide rail 142 and three notches 143 are transversely formed on the outer periphery of the engaged portion 14. The slide rail 142 and the notches 143 are closer to the second end 12 than the engaged recesses 141. The slide rail 142 communicates with the opening 131. A longitudinal cross-section area of the slider rail 142 is larger than the transverse cross-section area of the opening 131. The length of the slider rail 142 is smaller than the diameter of the engaged portion 14, and the slider rail 142 has one opening (not numbered) which is open to the periphery of the engaged portion 14.

The linkage 20 is slideably disposed in the opening 131. The cross-section of the linkage 20, which is preferably hexagon, corresponds to that of the opening 131 so that the linkage 20 cannot rotate with respect of the opening 131. The linkage 20 has a first end and a second end. An annular groove 21 is provided on the first end of the linkage 20 adjacent to the main body 10. A cross-section of the annular groove 21 is preferably circular. A first elastic element 22 is disposed in the opening 131 and sandwiched between the linkage 20 and the chuck member 60. The fastener 133 is inserted into the opening 131 through the slot 132 and grips on the annular groove 21. Thus, while the linkage 20 is pressed by the first elastic element 22 outwardly with respect of the opening 131, the fastener 133 is provided to restrict the linkage 20 for preventing the linkage 20 from detaching from the opening 131.

The bit storage member 30 includes a hexagon coupled hole 31 formed on the center thereof. The bit storage member 30 is mounted on the column 13 via the coupled hole 31. A plurality of first storage holes 32 and a second storage hole 33 are arranged on the bit storage member 30 around the coupled hole 31. Each of the first storage holes 32 is preferably hexagon. The first storage holes 32 are adapted for receiving various bits, and the second storage hole 33 is adapted for receiving a bit shank (not shown). A receptacle 144 is formed on the engaged portion 14 and corresponds to the second storage hole 33 so that the bit shank can be inserted through the second storage hole 33 and the receptacle 144 into the interior of the main body 10. A diameter of the bit storage member 30 is smaller than the diameter of the main body 10. A plurality of engaged recesses 34 is formed on the outer periphery of the bit storage member 30 annularly and respectively correspond to the engaged recesses 141 of the main body 10. At least one of the longitudinal extensions 134 is formed on the outer periphery of the column 13 and adjacent to the second end 12 of the main body 10 to prevent the bit storage member 30 from abutting against the main body 10.

The cap member 40 is able to be attached with the engaged portion 14 of the main body 10, and the linkage 20 is received in the cap member 40. A compartment 41 is defined in the cap member 40, and a connected hole 411 is formed in the bottom of the compartment 41. The second end of the linkage 20 is installed to the connected hole 411. The cap member 40 is slideable along the linkage 20 between a first position and a second position. In the first position, the cap member 40 is attached with the main body 10. In the second position, the cap member 40 is detached from the main body 10. Furthermore, a plurality of studs 412 is formed on the interior side of the compartment 41 and correspond to the engaged recesses 141 of the main body 10 to couple the cap member 40 to the main body 10 as the cap member 40 is in the first position. Alternatively, the cap member 40 can be adapted for storing bits or a bit shank as to omit the bit storage member 30.

Figure 2:
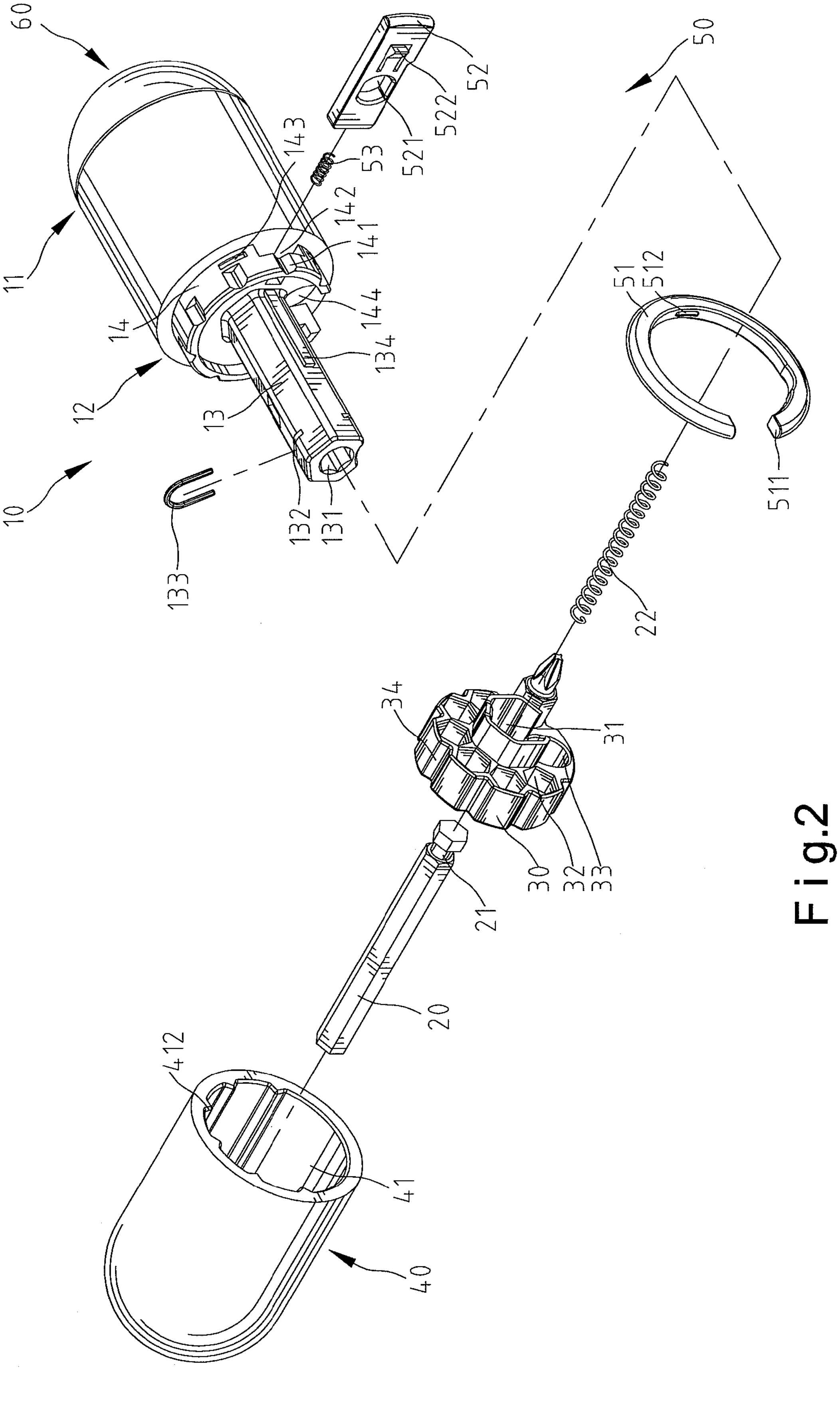
FIG. 2 is an exploded view of the screwdriver kit shown in FIG. 1.
Figure 3:
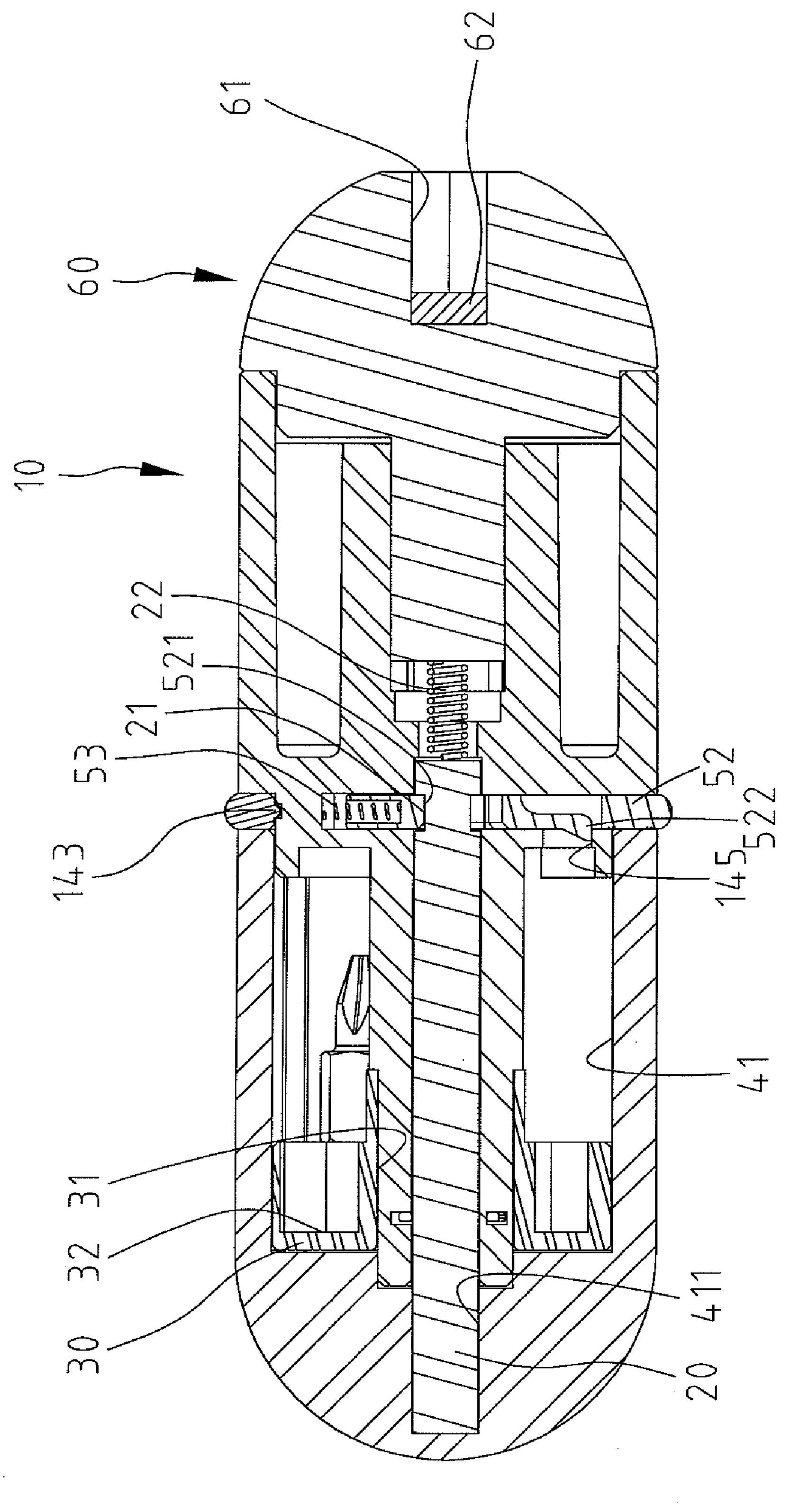
FIG. 3 is a cross-sectional view taken along 3-3 in FIG. 1, illustrating the linkage attached to the main body and the cap member being in the first position.
Figure 4:
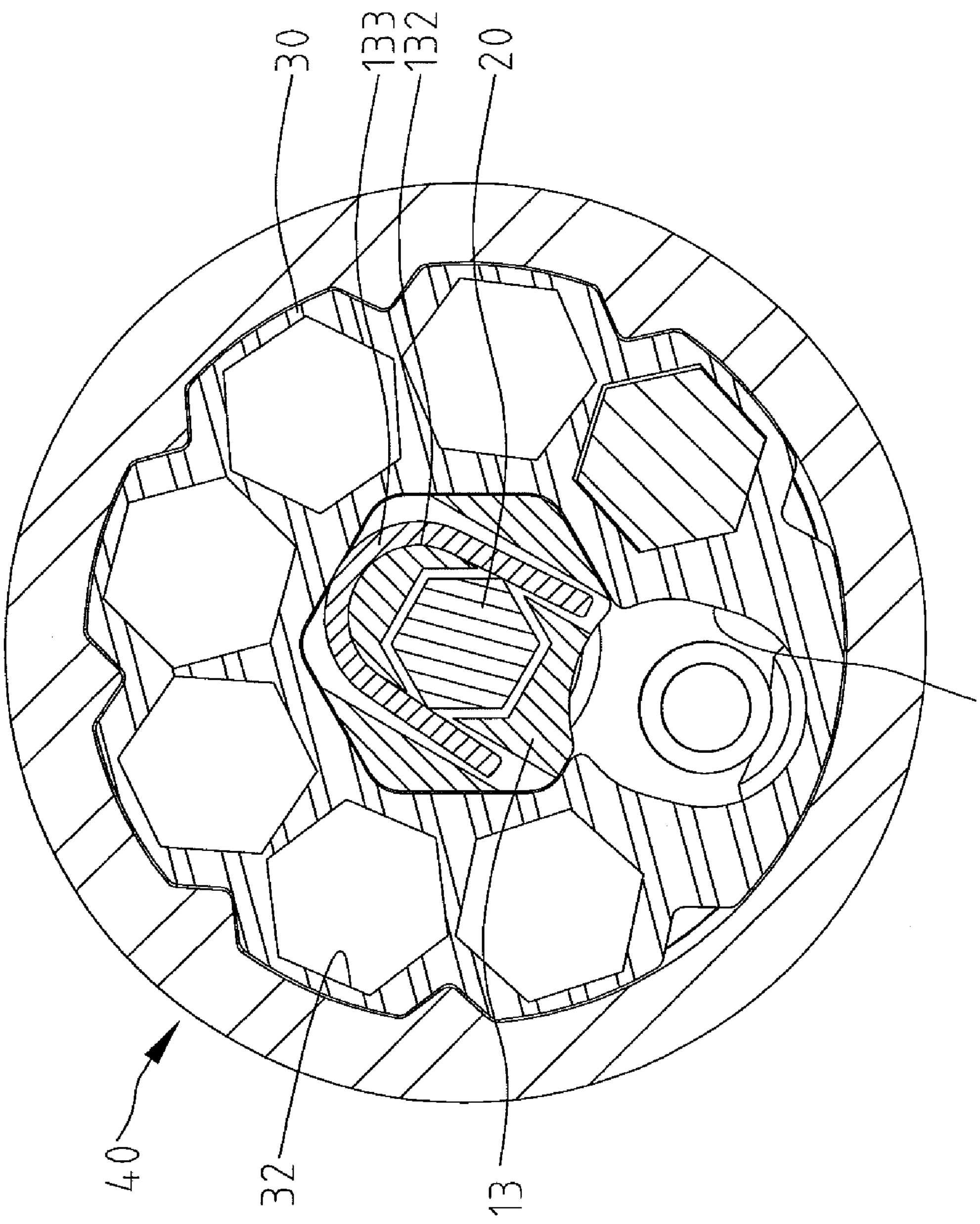
FIG. 4 is a cross-sectional view taken along 4-4 in FIG. 1.
Figure 5:
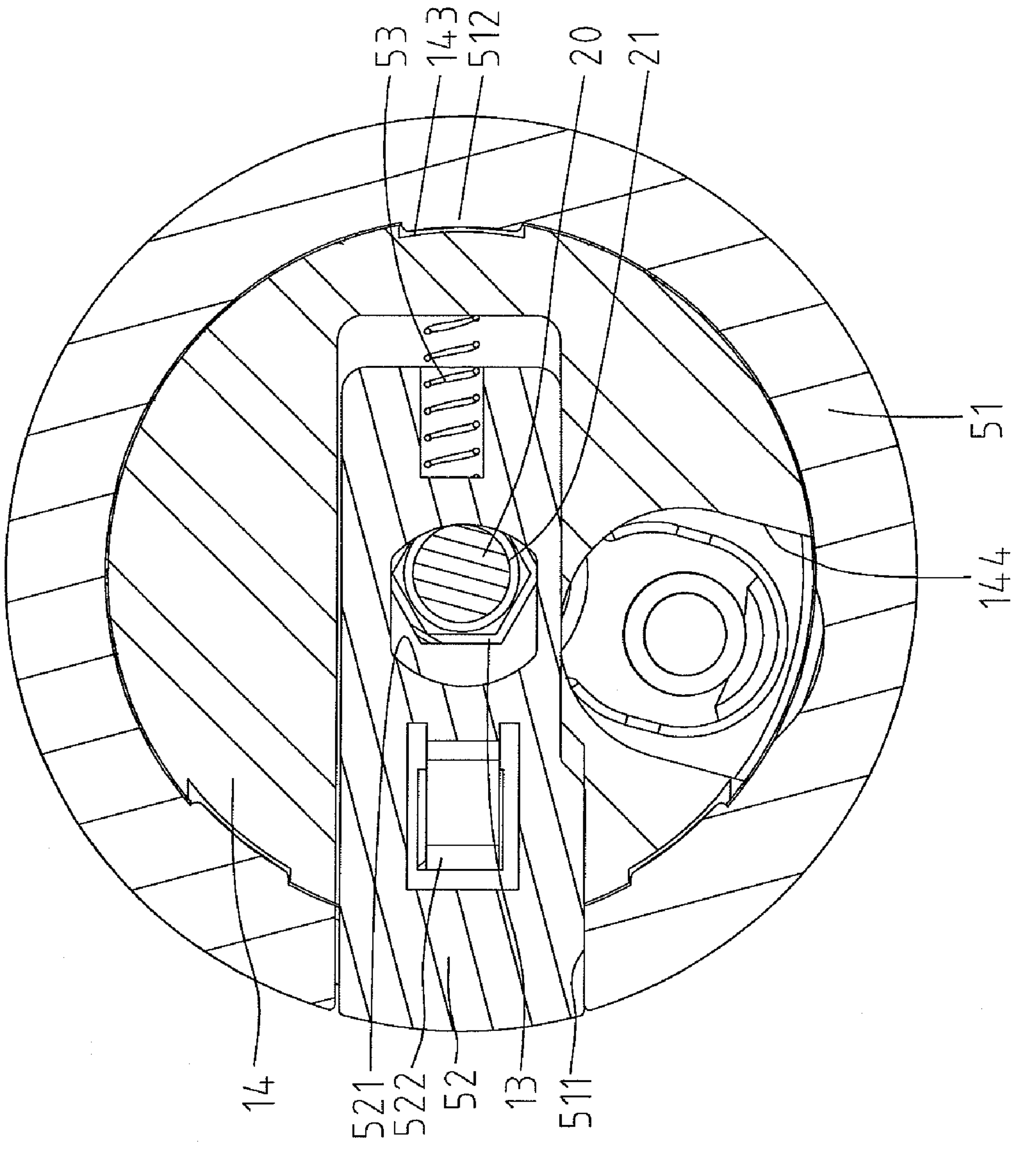
FIG. 5 is a cross-sectional view taken along 5-5 in FIG. 1.

Referring to FIGS. 2 and 5, the locking member 50 is adapted for restricting the cap member 40 in the first position and includes a clip 51, a detent 52 and a second elastic element 53. The clip 51 is preferably C-clip and has a gap 511 and three projections 512. The width of the gap 511 is the same as the width of the slide rail 142, and the projections 512 respectively correspond to the notches 143 as to couple the clip 51 on the outer periphery of the engaged portion 14 for preventing the engaged portion 14 from exposing outside. The detent 52 is slideably disposed in the slide rail 142 and has a first end and a second end. A through-hole 521 is defined on the detent 52 between the first and second ends of the detent 52 and corresponds to the opening 131. The second elastic element 53 is provided between the second end of the detent 52 and the slide rail 142 to engage the through-hole 521 of the detent 52 with the annular groove 21 of the linkage 20. Hence, the cap member 40 is fixed to the first position and attached with the main body 10. A restricting portion 522 is provided on the detent 52 adjacent to the second end of the detent 52 and engaged with a receiving hole 145 formed on the main body 10 to prevent the detent 52 from detaching from the slide rail 142. In addition, cooperation of the outer periphery of the second end of the detent 52 and the clip 51 exactly form a whole ring profile for aesthetic reasons.

Figure 6:
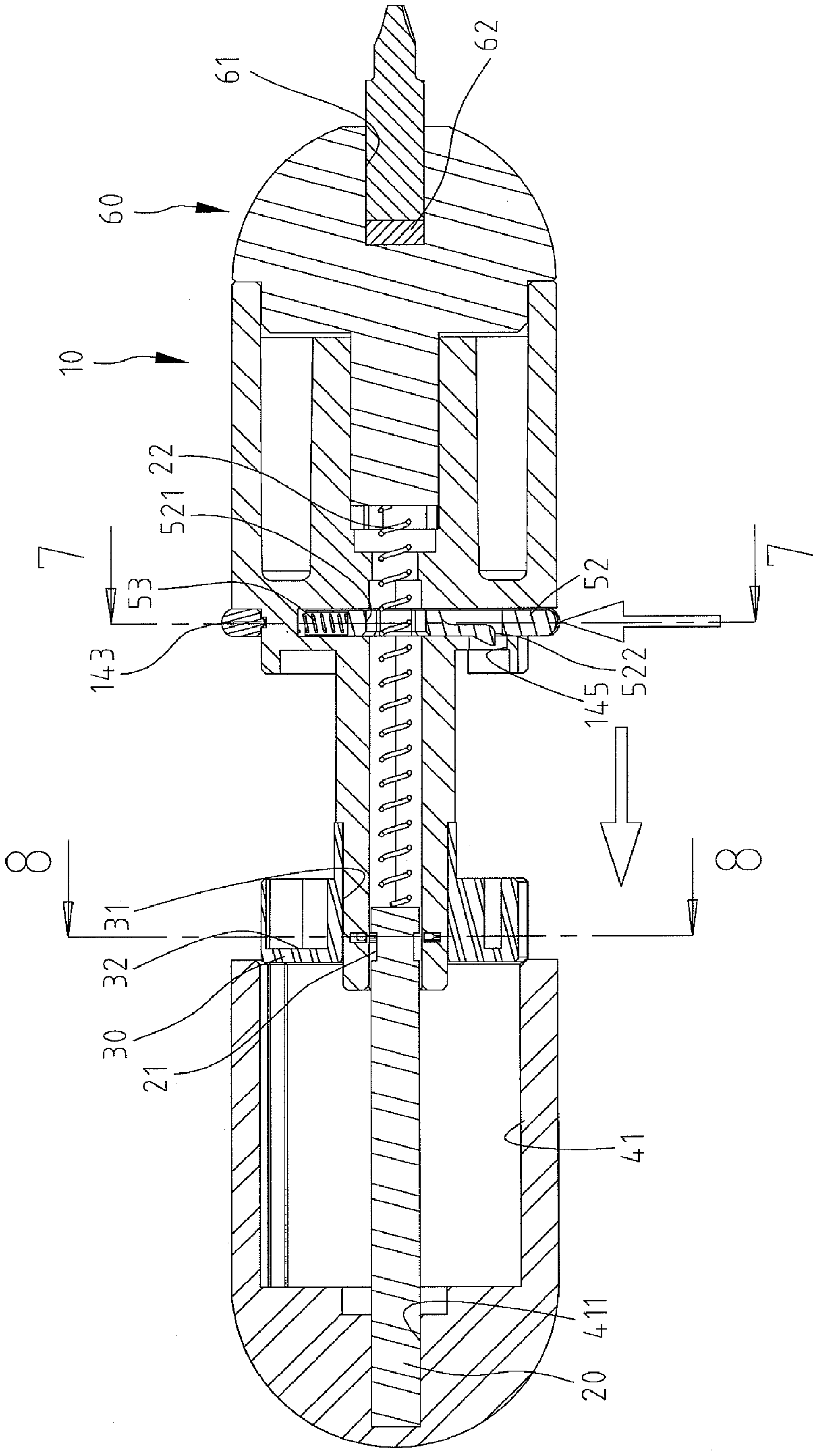
FIG. 6 is a cross-sectional view similar to FIG. 3, illustrating the linkage detached from the main body as to move the cap member to the second position.
Figure 7:
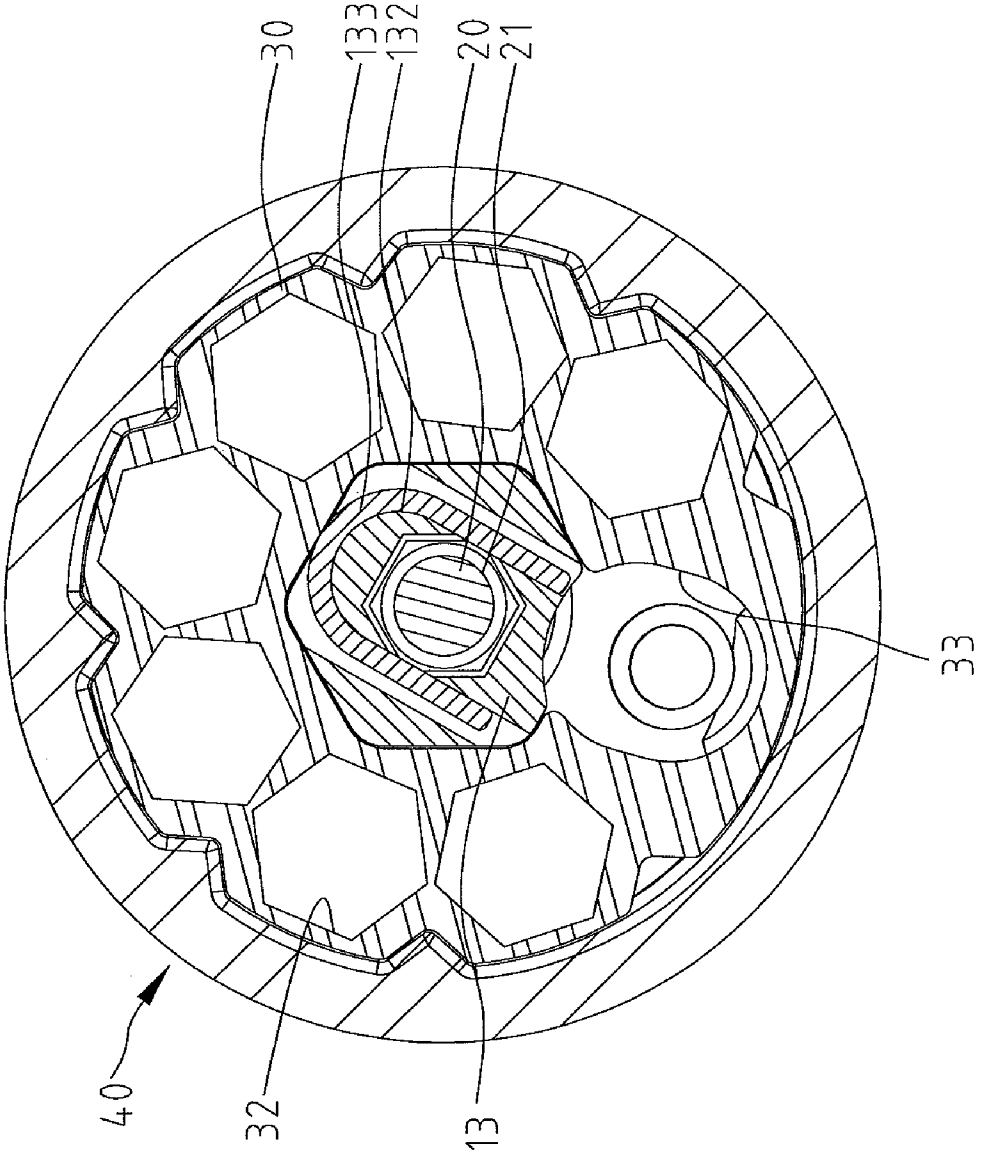
FIG. 7 is a cross-sectional view taken along 7-7 in FIG. 6.
Figure 8:
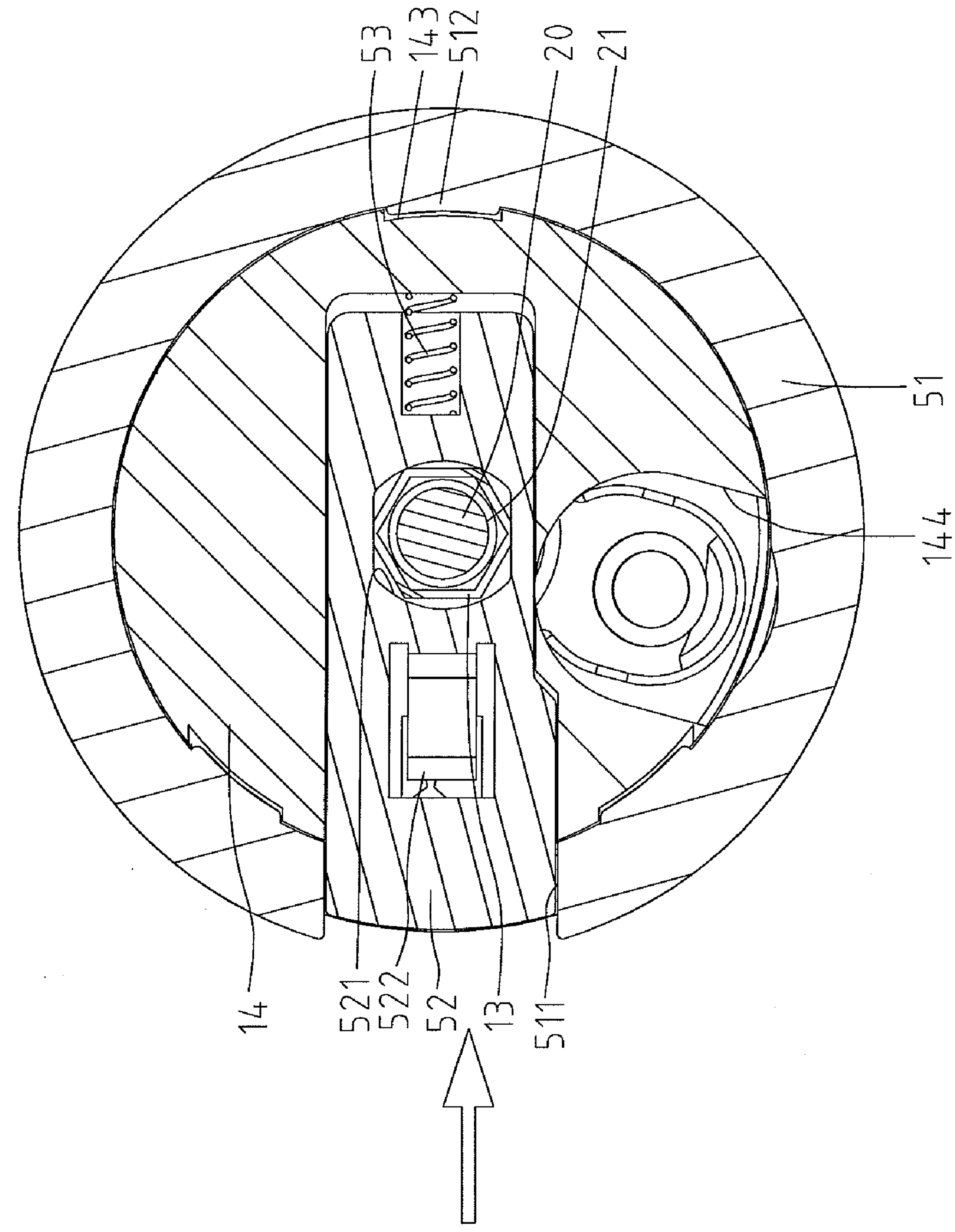
FIG. 8 is a cross-sectional view taken along 8-8 in FIG. 6.

Referring to FIGS. 6 through 8, after pressing the detent 52 toward the main body 10, the through-hole 521 of the detent 52 is disengaged from the annular groove 21, and the linkage 20 is not restricted by the detent 52 any more. The first elastic element 22 pushes the linkage 20 to detach from the main body 10, and the cap member 40 is driven to move to the second position from the first position till the fastener 133 is engaged with the annular groove 21. Therefore, the fastener 133 is adapted for preventing the linkage 20 from detaching from the opening 131. In the same time, the bit storage member 30 is exposed outside so that it is easy and convenient to remove the bits or the bit shank to connect with the chuck member 60 (as shown in FIG. 6).

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come with the meaning and range of equivalency of the claims are intended to be embraced therein.

What is claimed is:

1. A screwdriver comprising:

a main body having a first end adapted for connecting to a tool and a second end;

a column projecting from the second end of the main body and having an opening formed therein longitudinally;

a linkage having a first end and a second end, with the second end of the linkage slideably received in the opening;

a cap member having the second end of the linkage installed therein, with the cap member movable between a first position and a second position;

wherein the cap member is coupled to the main body when the cap member is in the first position;

wherein the cap member is detached from the main body along the linkage as the cap member is moved toward the second position;

a locking member provided between the cap member and the main body and selectively fixing the cap member to the main body in the first position; and a first elastic element for pushing the linkage outwardly with respect of the main body.

2. The coupling device as claimed in claim 1, further comprising a slide rail transversely formed on the outer periphery of the engaged portion and communicating with the opening of the column; wherein the locking member comprises a detent slideably disposed in the slide rail and a second elastic element provided between an end of the detent and the slide rail, and with the detent adapted for selectively fixing the cap member to the main body in the first position.

3. The screwdriver as claimed in claim 1, wherein a direction of the locking member is perpendicular to a direction of the column.

4. The coupling device as claimed in claim 3, wherein a direction of the detent of the locking member is perpendicular to a direction of the column.

5. The screwdriver as claimed in claim 2, wherein the slide rail communicates with the opening, and a longitudinal cross-section area of the slider rail is larger than a transverse cross-section area of the opening.

6. The screwdriver as claimed in claim 2, further comprising a clip having a gap, with the clip coupled on the outer periphery of the engaged portion preventing the engaged portion from being exposed outside.

7. A screwdriver comprising:

a main body having a first end adapted for connecting to a tool and a second end;

a column projecting from the second end of the main body and having an opening formed therein longitudinally;

a linkage having a first end and a second end, with the second end of the linkage slideably received in the opening;

a cap member having the second end of the linkage installed therein, with the cap member movable between a first position and a second position;

wherein the cap member is coupled to the main body when the cap member is in the first position;

wherein the cap member is detached from the main body along the linkage as the cap member is moved toward the second position;

a locking member provided between the cap member and the main body and selectively fixing the cap member to the main body in the first position;

an engaged portion formed on the second end of the main body and coupled to the cap member, with a diameter of the engaged portion being smaller than that of the outer periphery of the main body;

a plurality of engaged recesses longitudinally formed on the outer periphery of the engaged portion and spaced from each other; and a plurality of studs formed on an interior side of the cap member and corresponding to the engaged recesses of the main body as to couple the cap member to the main body when the cap member is in the first position.

8. The screwdriver as claimed in claim 7, wherein cross-sections of an outer periphery of the column, the opening of the column and the linkage are not circular.

9. The screwdriver as claimed in claim 7, wherein cross-sections of an outer periphery of the column, the opening of the column and the linkage are hexagonal.

10. A coupling device comprising:

a main body having a first end adapted for connecting to a tool and a second end;

a column projecting from the second end of the main body and having an opening formed therein longitudinally;

a linkage having a first end and a second end, with the second end of the linkage slideably received in the opening;

a cap member having the second end of the linkage installed therein, with the cap member movable between a first position and a second position;

wherein the cap member is coupled to the main body when the cap member is in the first position;

wherein the cap member is detached from the main body along the linkage as the cap member is moved toward the second position;

a locking member provided between the cap member and the main body and selectively fixing the cap member to the main body in the first position;

a slot formed on an outer periphery of the column and adjacent to an extremity of the column opposite to the second end of the main body;

a fastener received in the slot, inserted into the opening and gripping on the annular groove selectively;

a bit storage member including a coupled hole formed on the center thereof, with the bit storage member mounted on the column via the coupled hole; and a plurality of first storage holes and a second storage hole arranged on the bit storage member around the coupled hole.

11. The screwdriver as claimed in claim 10, further comprising an annular groove provided on a first end of the linkage adjacent to the main body, and with the annular groove selectively communicating with the detent.

12. The screwdriver as claimed in claim 11, further comprising a through-hole defined on the detent and corresponding to and communicating with the opening as to selectively communicate with the annular groove; and a restricting portion on the detent engaged with a receiving hole formed on the main body to prevent the detent from detaching from the slide rail.

13. The screwdriver as claimed in claim 10, further comprising at least one longitudinal extension formed on the outer periphery of the column for preventing the bit storage member from abutting against the main body.

14. The screwdriver as claimed in claim 10, wherein a cross-section of the outer periphery of each first storage hole is hexagonal.

15. The screwdriver as claimed in claim 10, wherein cross-sections of an outer periphery of the coupled hole and the linkage are hexagonal.

16. The screwdriver as claimed in claim 10, wherein the cap member further includes a compartment and a connected hole formed in a bottom of the compartment, with the second end of the linkage installed to the connected hole.

17. The screwdriver as claimed in claim 10, further comprising a chuck member detachably installed to the first end of the main body and including a bore formed thereon and a magnetic portion provided in the bore.

* * * * *